(12) United States Patent
Gonzalez Liñero

(10) Patent No.: US 7,984,876 B2
(45) Date of Patent: Jul. 26, 2011

(54) AIRCRAFT WALKWAY

(75) Inventor: Luis Gonzalez Liñero, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 12/923,057

(22) Filed: Aug. 31, 2010

(65) Prior Publication Data

US 2010/0327118 A1  Dec. 30, 2010

Related U.S. Application Data

(62) Division of application No. 11/798,828, filed on May 17, 2007, now Pat. No. 7,828,248.

(30) Foreign Application Priority Data

May 18, 2006 (GB) .................................. 0609892.5

(51) Int. Cl.
    *B64C 1/24* (2006.01)
(52) U.S. Cl. ................ 244/129.6; 244/137.2; 244/137.1
(58) Field of Classification Search ............... 244/129.6, 244/137.2, 137.1, 118.1, 118.2, 905; 296/53, 296/50

See application file for complete search history.

(56) References Cited

U.S. PATENT DOCUMENTS

| | | | |
|---|---|---|---|
| 2,990,148 A * | 6/1961 | James .......................... 244/129.6 |
| 4,014,486 A | 3/1977 | Nelson et al. |
| 4,018,321 A | 4/1977 | Fisher |
| 4,113,207 A | 9/1978 | Dalziel |
| 4,140,291 A | 2/1979 | Evans et al. |
| 4,235,399 A | 11/1980 | Shorey |
| 5,140,716 A | 8/1992 | Rawdon et al. |
| 5,357,876 A * | 10/1994 | Kniefel et al. ................... 108/92 |
| 5,395,075 A | 3/1995 | Sprenger et al. |
| 5,490,703 A | 2/1996 | Hewko |
| 5,785,277 A | 7/1998 | Manning et al. |
| 6,312,205 B1 * | 11/2001 | Vandenberg ................. 414/24.5 |
| 6,585,188 B2 | 7/2003 | Alli |
| 6,698,545 B2 | 3/2004 | Baker et al. |
| 7,128,357 B1 | 10/2006 | Carroll |
| 2003/0178252 A1 * | 9/2003 | Schmid, Jr. ..................... 182/84 |
| 2003/0219329 A1 | 11/2003 | Ganiere |
| 2005/0210776 A1 | 9/2005 | Mills |
| 2006/0284439 A1 | 12/2006 | Carroll |

* cited by examiner

Primary Examiner — Christopher P Ellis
(74) Attorney, Agent, or Firm — Nixon & Vanderhye, P.C.

(57) ABSTRACT

An aircraft 1 comprises a walkway 11 moveable between a stowed position and a deployed position. The aircraft may be arranged such that the walkway, in the deployed position, defines a path, at least a portion of which extends from the fuselage at an angle, when viewed from above, of less than 90 degrees to the longitudinal axis of the aircraft. The walkway 11, in the stowed position, may be located at an angle, when viewed from above, of less than 80 degrees to the longitudinal axis of the aircraft. The opening 9 may be located in a region extending from 20% to 80% of the total cabin length. The walkway may be further moveable to a second deployed position. A longitudinal portion of the walkway 13, in the first deployed position, may define a stepped surface having a first step height, whereas that longitudinal portion of the walkway 13, in the second deployed position, may define either (a) a substantially even surface, or (b) a stepped surface having a second step height, the second step height being less than the first step height.

9 Claims, 8 Drawing Sheets

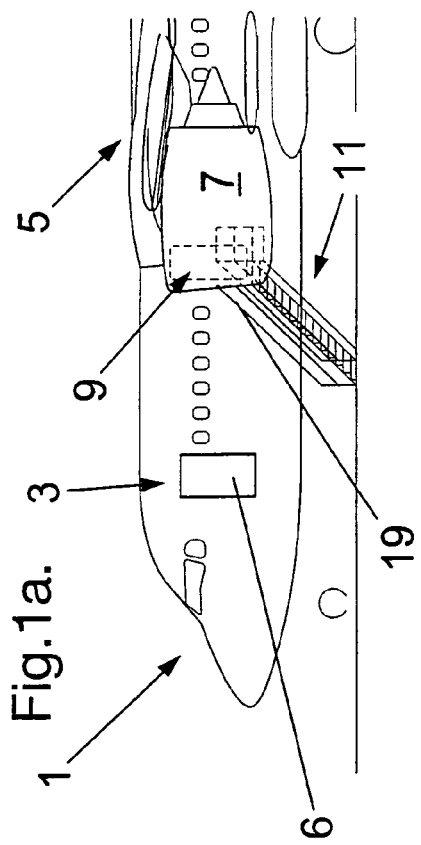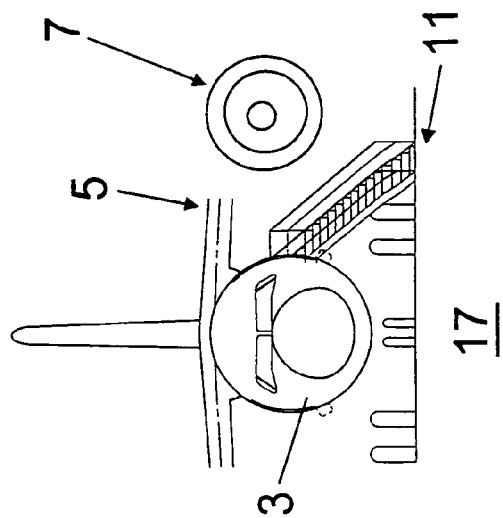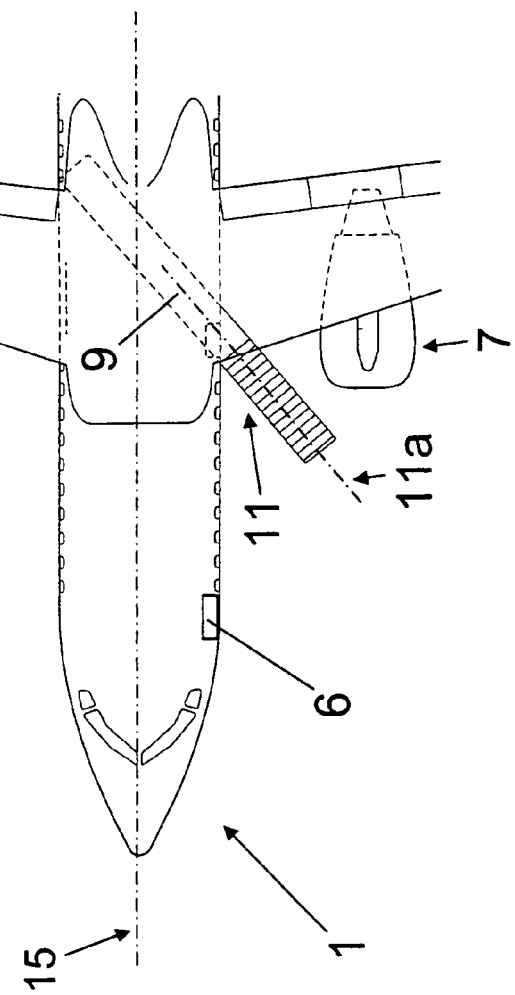

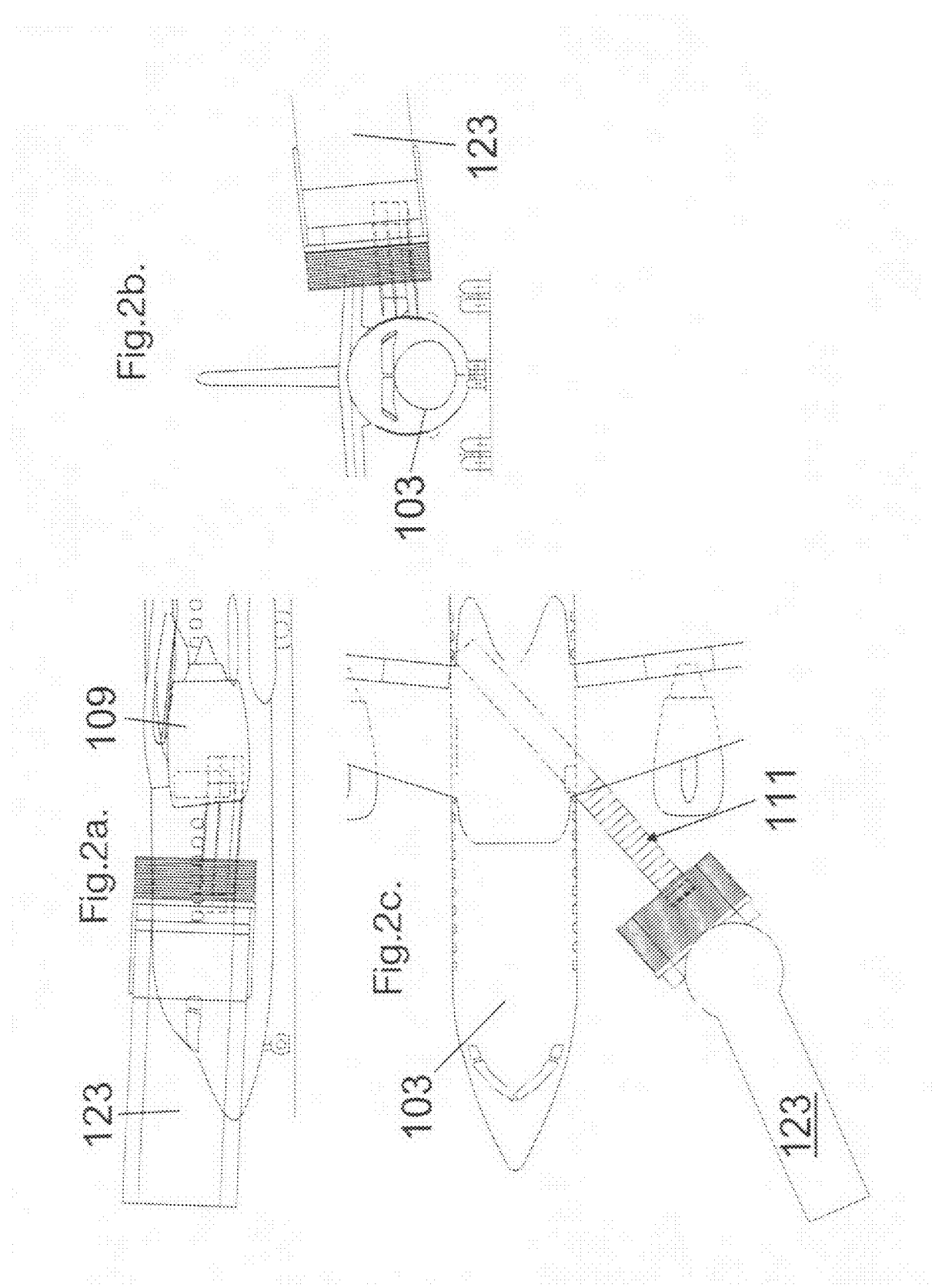

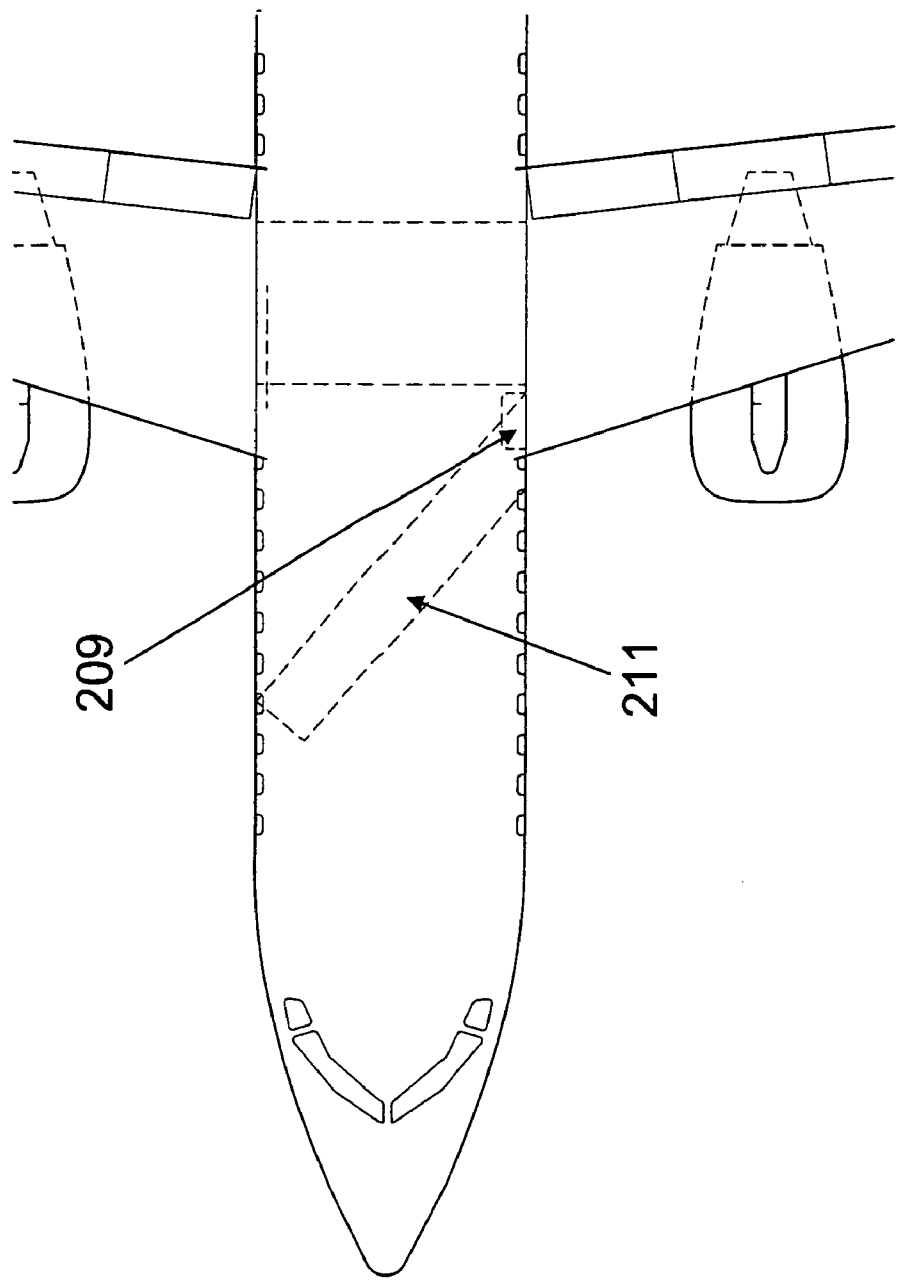

AIRCRAFT WALKWAY

RELATED APPLICATIONS

This application is a Division of application Ser. No. 11/798,828, filed May 17, 2007 now U.S. Pat. No. 7,828,248 and claims priority from, UK Patent Application Number 0609892.5, filed May 18, 2006, the disclosure of which is hereby incorporated by reference herein in its entirety.

BACKGROUND OF THE INVENTION

The present invention relates to aircraft and more particularly to an aircraft walkway arrangement.

Providing a passenger exit in certain regions of an aircraft cabin, such as a central region, has been found to be desirable. Such an arrangement may for example, enable an efficient use of cabin space, enable a reduction in passenger congestion and/or enable a reduction in aircraft turnaround times. However, many known aircraft walkways for accessing an aircraft exit (such as airstairs and air-bridges) would be impractical for use on an exit in certain regions of the cabin as they would interfere with parts of the aircraft structure, for example the wing or an engine. Alternatively or additionally, many walkways would take passengers into restricted areas, such as the region in the vicinity of the aircraft engines, and thus not comply with safety regulations.

Many walkways are specifically arranged to connect a passenger exit with the ground (for example, where passengers are required to board a bus for transport to and from the airport building). Such walkways (for example mobile airstairs) are often however, located on the ground and require ground staff to operate, and to connect them, with the aircraft exit. Having airport-based walkways can be the source of delays, as they may not be available when required. In addition, the useability of the exit may be solely dependent on the ground-based mobile airstairs, giving poor flexibility as to when and where the passengers may disembark.

It is known to integrate embarking/disembarking walkways with an aircraft structure. Often however, the integrated walkway typically needs to be made up of segments or telescopic parts such that it can be stored in a relatively compact form. This may limit the strength of the walkway and can make it unduly complex.

SUMMARY OF THE INVENTION

The present invention seeks to mitigate or remove at least some of the above-mentioned disadvantages. Alternatively or additionally, the present invention seeks to provide an aircraft comprising a walkway for use with an exit in a central region of the aircraft cabin, to provide a multipurpose walkway and/or to provide an improved stowing arrangement of an aircraft walkway.

A first aspect of the present invention provides an aircraft comprising (i) a fuselage defining a fuselage interior, (ii) an opening defined by, and located in a side of, the fuselage, and suitable for passenger access to the fuselage interior, and (iii) a walkway moveable between a stowed position, and a deployed position in which the walkway connects the opening with a location remote from the aircraft, wherein the aircraft is arranged such that the walkway, in the deployed position, defines a path, at least a portion of which extends from the fuselage at an angle, when viewed from above, of less than 90 degrees to the longitudinal axis of the aircraft. The walkway, in the deployed position, may define a path, at least a portion of which extends from the fuselage at an angle, when viewed from above, of less than 80 degrees to the longitudinal axis of the aircraft. The walkway, in the deployed position, may define a path, at least a portion of which extends from the fuselage at an angle, when viewed from above, of more than 5 degrees, and more preferably more than 10 degrees, to the longitudinal axis of the aircraft.

Providing a walkway, at least a portion of which extends at such an angle (in contrast to known airstairs which extend at 90 degrees to the fuselage) allows the walkway to be kept away from surrounding parts of the aircraft structure, such as the wing or the aircraft engines. In addition, the walkway may be angled such that it is outside a prohibited region surrounding the aircraft engines. Certain embodiments of the present invention are of particular benefit when in the form of an aircraft having an exit in a central portion of a passenger cabin.

The angle (to the longitudinal axis of the aircraft) of the path may, for example if not readily identifiable, be defined as the angle (when viewed from above) defined between the longitudinal axis and a notional line extending from the middle point at one extreme end of the path, or the portion thereof, to the middle point at the other extreme end. The length (when viewed from above) of the portion of the path that is so angled may for example be greater than 2 m, and may be greater than 3 m, and may even be greater than 5 m.

The stowed position may, for example if not readily identifiable, be defined as the position of the walkway in which the walkway no longer serves as a connection, along which a passenger could travel, between the opening and a location remote from the aircraft. The stowed position may for example be a position in which the walkway is wholly contained within the aircraft, for example (as mentioned below) within the fuselage.

At least a portion of the path may extend from the fuselage at an angle, when viewed from above, of more than 20 degrees, and more preferably more than 30 degrees. At least a portion of the path may extend from the fuselage at an angle, when viewed from above, of less than 70 degrees, and more preferably less than 60 degrees. A portion of the path may extend in a direction substantially parallel to the longitudinal axis of the aircraft.

The walkway may define a path, which initially extends at an angle (when viewed from above) that is substantially perpendicular to the longitudinal axis of the aircraft, but which comprises a portion which extends at an angle of less than 90 degrees to the longitudinal axis of the aircraft. The walkway may therefore include a turn or bend along its length when deployed. However, the walkway preferably defines a substantially straight path. Thus, preferably the entire path extends from the fuselage at an angle, when viewed from above, of less than 90 degrees, and more preferably between 10 and 80 degrees to the longitudinal axis of the aircraft.

The walkway, in the deployed position, may also extend from the fuselage at an angle to the horizontal. The walkway, in the deployed position, may extend from the fuselage at an angle to the horizontal of between −20 and 60 degrees. For example, the location remote from the aircraft may be on an air-bridge, in which case the walkway, in the deployed position, may typically extend from the fuselage at a small angle to the horizontal such as 5 degrees, or even at a negative angle such as −10 degrees (a negative angle being understood to mean an angle such that the walkway is inclined above the horizontal). The location remote from the aircraft may be the ground, in which case the walkway, in the deployed position, may typically extend from the fuselage at a relatively large angle to the horizontal such as 45 degrees.

The path defined by the walkway in the deployed position may be a substantially even surface. This may be of benefit when, for example, the walkway extends from the fuselage at a relatively small angle to the horizontal.

The path defined by the walkway in the deployed position may comprise a stepped surface. This may be of benefit when, for example, the walkway extends from the fuselage at a relatively large angle to the horizontal and is used as a conventional passenger walkway.

The opening may, in some circumstances, act as an emergency exit. In these circumstances, the walkway may be arranged to extend from the fuselage at a relatively large angle to the horizontal, but the path may be a substantially even surface to enable passengers to slide down the walkway. Alternatively or additionally, the walkway may act as a support to a separate emergency slide, such as an inflatable slide.

The opening may be a regular exit. The term "regular exit" means any exit that could be used regularly by passengers to gain access to the aircraft and may cover within its scope an exit that may be used as an emergency exit, but excludes an exit that would only ever be used as an emergency exit. It shall be appreciated that the term 'exit' is used herein to refer to an opening through which passengers may embark, as well as disembark, the aircraft. Such an opening will typically be associated with a door. It will be appreciated that in some embodiments additional exits in the form of emergency exits may need to be provided.

According to another aspect of the present invention there is provided an aircraft comprising (i) a fuselage defining a fuselage interior, (ii) an opening defined by, and located in a side of, the fuselage, and suitable for passenger access to the fuselage interior, and (iii) a walkway moveable between a stowed position, and a deployed position in which the walkway connects the opening with a location remote from the aircraft, wherein the aircraft is arranged such that the walkway, in the stowed position, is located at an angle, when viewed from above, of less than 90 degrees, and more preferably less than 80 degrees, to the longitudinal axis of the aircraft.

Stowing the walkway in accordance with certain embodiments of the present invention gives rise to a number of benefits. The stowed length of the walkway is not necessarily limited by the width of the fuselage available. The walkway may have a stowed length of greater than the useable width of the fuselage. For example, the walkway (depending on its stowed width and angle of stowage) may have a stowed length approximately equal to the fuselage width/sin 60 degrees (i.e. about 115% the fuselage width). The walkway may have a stowed length greater than 110% of the useable width of the fuselage in the region of stowage of the walkway. This enables the walkway to be stored as a unitary structure and mitigates the need for the walkway to be made up from segments, telescopic parts etc. in order to fit into the width of the fuselage. Thus the walkway can be stronger and/or simpler than known walkway designs.

The angle of the walkway in the stowed position may, for example if not readily identifiable, be defined as the average angle, over a distance of 1.0 m, of the centre-line of the walkway to the longitudinal axis of the aircraft (as viewed from above).

It will be appreciated that the angle of the walkway in the stowed position can be measured in either an anti-clockwise direction from the longitudinal axis of the aircraft, or a clockwise direction from the longitudinal axis of the aircraft. Thus in some embodiments of the invention, the walkway, in the stowed position, may be generally pointing, from the opening, towards the rear of the aircraft. In other embodiments of the invention, the walkway may be generally pointing, from the opening, towards the front of the aircraft.

The majority of the walkway, in the stowed position, is preferably located in the fuselage. More preferably, the walkway, in the stowed position, is wholly located in the fuselage.

The walkway is preferably stowed as a unitary structure. The length of the walkway is preferably the same in the deployed and the stowed positions.

The aircraft may be arranged such that the walkway, in the stowed position, is located at an angle, when viewed from above, of more than 10 degrees, more preferably more than 20 degrees and yet more preferably more than 30 degrees to the longitudinal axis of the aircraft. The aircraft may be arranged such that the walkway, is located at an angle, when viewed from above, of less than 70 degrees, and more preferably less than 60 degrees to the longitudinal axis of the aircraft. The walkway, in the stowed position, may be located at an angle, when viewed from above, of less than 50 degrees to the longitudinal axis of the aircraft.

The walkway is preferably substantially straight. Preferably at least 60% and more preferably at least 90% of the walkway defines a straight path.

The angle of the walkway to the longitudinal axis of the aircraft is preferably the same in both the stowed, and the deployed positions. This enables a relatively simple mechanism to be provided for deploying the walkway.

The walkway, in the stowed position, may be located at a different angle, when viewed from above, to the walkway in the deployed position. The walkway may be rotatable between its orientation in the stowed position and its orientation in the deployed position.

Certain embodiments of the present invention are of particular benefit when in the form of aircraft having an exit in a portion of a passenger cabin that is difficult to access with conventional airstairs, such as an opening in a central region of the cabin.

According to another aspect of the invention, there is provided an aircraft comprising (i) a fuselage defining a fuselage interior, (ii) an opening defined by, and located in a side of, the fuselage, and suitable for passenger access to the fuselage interior, (iii) a walkway moveable between a stowed position, and a deployed position in which the walkway connects the opening with a location remote from the aircraft, and (iv) a passenger cabin housed in the fuselage interior, wherein the opening is suitable for accessing the passenger cabin, and the opening is located in a region extending from 20% to 80% of the total cabin length. The opening may be located in the region extending from 30% to 70% of the total cabin length. The opening may be located in the region extending from 40% to 60% of the total cabin length. The opening may be off-centre, for example, the opening may be located in the region extending from 20% to 50% of the total cabin length. The opening may be located in the region extending from 50% to 80% of the total cabin length. Such an arrangement may for example, enable an efficient use of cabin space, enable a reduction in passenger congestion and/or enable a reduction in aircraft turnaround times.

An aircraft comprising an opening in a central region of the fuselage is described in GB Application No GB0609888.3 having a filing date of 18 May 2006 entitled "Aircraft Cabin Configuration", Airbus SAS and Airbus France SAS Ref: XA2214. The contents of that application are fully incorporated herein by reference. The aircraft of the present invention may incorporate any of the features disclosed in that patent application. In particular, the claims of the present application may be amended to include the feature of the aircraft including the primary opening, and the opening may be defined with reference to features of the aircraft described or claimed in the above-mentioned related patent application.

The opening may be located in a region that is level with an aircraft engine. The opening may be located in the vicinity of an aircraft engine. The opening may be over the aircraft wing. The opening may be under the aircraft wing. Such an opening may be difficult to access with conventional aircraft walkways.

It may be desirable to provide a walkway that can be used to connect the opening with a variety of locations remote from the aircraft. According to yet another aspect of the invention, there is provided an aircraft comprising (i) a fuselage defining a fuselage interior, (ii) an opening defined by, and located in a side of, the fuselage, and suitable for passenger access to the fuselage interior, and (iii) a walkway moveable between a stowed position, and first and second deployed positions in which the walkway connects the opening with a location remote from the aircraft, wherein a longitudinal portion of the walkway, in the first deployed position, defines a stepped surface having a first step height, whereas that longitudinal portion of the walkway, in the second deployed position, defines a stepped surface having a second step height, the second step height being less than the first step height. According to yet another aspect of the invention, there is provided an aircraft comprising (i) a fuselage defining a fuselage interior, (ii) an opening defined by, and located in a side of, the fuselage, and suitable for passenger access to the fuselage interior, and (iii) a walkway moveable between a stowed position, and first and second deployed positions in which the walkway connects the opening with a location remote from the aircraft, wherein a longitudinal portion of the walkway, in the first deployed position, defines a stepped surface having a first step height, whereas that longitudinal portion of the walkway, in the second deployed position, defines a substantially even surface. This aspect is similar to the other aspect of the invention mentioned immediately above and can be considered as covering the case where the second step height is reduced to zero.

Certain embodiments of the present invention thus provide an aircraft comprising a walkway for connecting a variety of locations. For example, the location remote from the aircraft may be on an air-bridge (for example where the opening is located centrally on the fuselage such that an air-bridge cannot directly access the opening) such that the angle of the walkway to the horizontal is relatively low. In which case the walkway may be deployed in the second deployed position such that the walkway defines a substantially even surface which affords a low risk of tripping and easy disabled access to the aircraft.

The walkway may be considered as being moveable between a stowed position and a first deployed position in which the walkway extends from the fuselage at a first angle to the horizontal and also being moveable between the stowed position and a second deployed position, in which the walkway extends from the fuselage at a second angle to the horizontal and connects the opening with a location remote from the aircraft, the second angle being different from the first angle. The second angle may for example be in the range of −10 degrees to +10 degrees to the horizontal. The first angle may be between +20 and +60 degrees to the horizontal.

The location remote from the aircraft may be the ground, in which case the walkway may be deployed in the first deployed position such that a plurality of discrete steps is provided that enables passengers to easily negotiate the relatively large height drop from the aircraft to the ground.

The location remote from the aircraft may be the top of a set of steps or the like, which are in turn associated with another location remote from the aircraft. In which case, the walkway may be deployed in the second deployed position such that the walkway defines a stepped surface having a second step height, the second step height being less than the first step height.

Certain embodiments of the present invention therefore enable the aircraft to have greater flexibility in terms of where, and when, the walkway can be deployed. Certain embodiments of the present invention may mitigate the need for ground staff to provide ground-based walkway such as mobile airstairs.

The walkway may comprise a plurality of step treads, and be arranged such that, in the first deployed position, the step treads define the stepped surface comprising a plurality of discrete steps having the first step height, whereas in the second position, the step treads either (a) are generally co-planar such that at least a portion of the walkway comprising the step treads defines a substantially even surface, or (b) define the stepped surface comprising a plurality of discrete steps having the second step height.

The walkway may be arranged such that the walkway, in the stowed position, defines a substantially even surface. The walkway may be arranged such that, in the stowed position, at least two of the step treads are generally co-planar such that at least a portion of the walkway comprising the two step treads defines a substantially even surface. In the stowed position a multiplicity of step treads may be generally co-planar such that at least a portion of the walkway comprising the multiplicity of step treads defines a substantially even surface.

An embodiment of the present invention therefore enables the walkway to be stored in a relatively compact form. In particular, when in the stowed position, the walkway may be substantially flat such that it occupies relatively little space in the aircraft.

The walkway may comprise a support frame for supporting the treads. The support frame may define a longitudinal edge of the walkway. The walkway may be moveable on a rack and pinion mechanism. The support frame may be mounted on the rack and pinion mechanism. The treads may be rotatable with respect to the general structure of the walkway, and more preferably with respect to the support frame. The treads may be rotated by a chain and gear mechanism. The chain and gear mechanism may be located within the support frame.

The walkway may comprise a barrier located along at least part of a longitudinal edge of the walkway. The barrier may be mounted on the support frame. The walkway, in the deployed position, may comprise a barrier located along at least part of a longitudinal edge of the walkway. The barrier may be moveable, relative to the walkway, between a deployed position and a stowed position. The barrier may be in the deployed position when the walkway is in the deployed position, and the barrier may be in a stowed position when the walkway is in the stowed position. The barrier is preferably arranged, in the deployed position, to prevent passengers moving past a longitudinal edge of the walkway. The barrier in the stowed position may be located substantially in the plane of the walkway.

The walkway may comprise a barrier along both longitudinal edges. The barrier may comprise a handrail.

The aircraft preferably comprises a door associated with the opening located in a side of the fuselage. The walkway may be integrated with the door, but is more preferably, in the stowed position, located in the aircraft structure in the vicinity of the opening.

According to another aspect of the invention, there is provided a walkway suitable for use as the walkway on the aircraft according to any aspect of the invention described herein.

According to yet another aspect of the invention there is provided a walkway comprising a plurality of step treads, wherein the walkway is arranged such that, in the first deployed position, the step treads define a stepped surface comprising a plurality of discrete steps having the first step height, whereas in the second position, the step treads either (a) are generally co-planar such that at least a portion of the walkway comprising the step treads defines a substantially even surface, or (b) define the stepped surface comprising a plurality of discrete steps having the second step height. The walkway may be so arranged that when installed on an aircraft and deployed in the first position, the walkway extends from the fuselage at a first angle to the horizontal, whereas when deployed in the second deployed position, the walkway extends from the fuselage at a second angle to the horizontal, the second angle being different from the first angle. The walkway may comprise one or more fixings for attaching the walkway to the aircraft. The walkway may be so arranged that when in the first position it extends in a direction at a first angle to a plane that is parallel with the step treads, whereas when the walkway is in the second deployed position the walkway extends in a direction at a second angle to a plane that is parallel with the step treads, the second angle being different from the first angle. The second angle may be zero.

According to yet another aspect of the invention there is provided a method of operating an aircraft according to any other aspect of the invention described or claimed herein including a walkway. The method may for example include a step of moving the walkway from the stowed position to a deployed position (and/or a step of moving the walkway from the deployed position to a stowed position). It will be appreciated that where the step of moving the walkway from the stowed position to the deployed position is described herein the features or steps mentioned may also be equally applicable to a method of moving the walkway from the deployed position to the stowed position (reversing the steps as appropriate).

The step of moving the walkway may include sliding the walkway from the stowed position to an intermediate position. The walkway may then be moved from the intermediate position to a deployed position.

The moving of the walkway may include a step of rotating the walkway to the deployed position. The rotating of the walkway may include a component of rotation about a vertical axis, for example to swing the walkway to an angle (to the longitudinal axis when viewed from above) different from the angle of stowage. Such a step may be performed when the walkway is in an intermediate position. The rotating of the walkway may include a component of rotation about a horizontal axis. Thus the walkway may be rotated about an axis that is substantially coincident with the end of the walkway at the opening. Such a step may be performed when the walkway is in an intermediate position. The horizontal axis of rotation may be transverse to the length of the walkway in the region of axis of rotation.

The walkway may comprise a plurality of step treads. In such a case, the moving of the walkway may include rotating each step tread relative to the walkway about a horizontal axis that is transverse to the length of the walkway in the region of the tread.

Separate and independent motors may be used to cause (a) the sliding movement of the walkway, (b) the rotation of the walkway, and (c) the rotation of the stair treads.

The walkway may be configured to be deployed to first and second (and possibly, but not necessarily, more) different deployed positions. In such a case, the above method may be performed to move the walkway to or from the first deployed position. The above method may be performed to move the walkway to or from the second deployed position.

It shall be appreciated that features of one aspect of the present invention are equally applicable to another aspect of the present invention. For example, the present invention may provide an aircraft in which: the walkway, in the deployed position, defines a path, at least a portion of which extends from the fuselage at an angle, when viewed from above, of less than 90 degrees to the longitudinal axis of the aircraft; and in which the walkway is further moveable to a second deployed position in which the walkway connects the opening with a location remote from the aircraft, wherein a longitudinal portion of the walkway, in the first deployed position, defines a stepped surface having a first step height, whereas that longitudinal portion of the walkway, in the second deployed position, defines either (a) a substantially even surface, or (b) a stepped surface having a second step height, the second step height being less than the first step height. The present invention may, for example, also provide an aircraft arranged such that the walkway, in the stowed position, is located at an angle, when viewed from above, of less than 80 degrees to the longitudinal axis of the aircraft, and wherein the walkway, in the deployed position, comprises a barrier located along at least part of a longitudinal edge of the walkway.

DESCRIPTION OF THE DRAWINGS

Various embodiments of the invention will now be described, by way of example only, with reference to the accompanying schematic drawings of which:

FIGS. 1*a* to 1*d* are views of an aircraft according to a first embodiment of the invention;

FIGS. 2*a* to 2*c* are views of an aircraft according to a second embodiment of the invention;

FIG. 7 is a view of an aircraft according to a third embodiment of the invention.

DETAILED DESCRIPTION

Figure 1D:
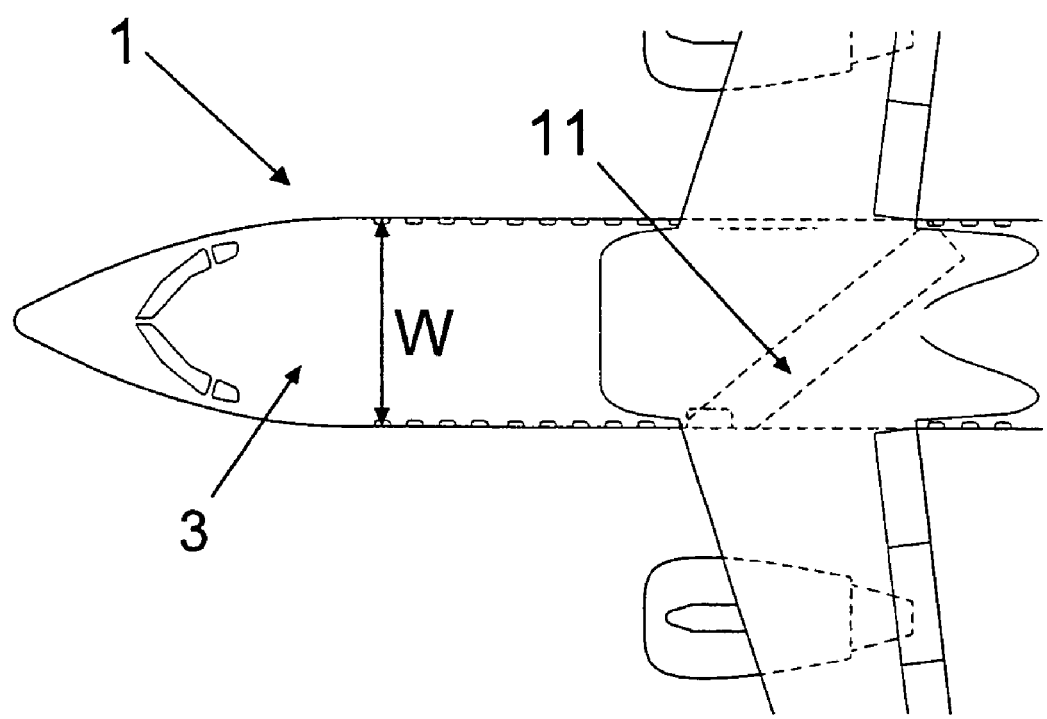

FIGS. 1*a* to 1*d* are views of an aircraft 1 according to a first embodiment of the invention. The aircraft comprises a fuselage 3, a high-mounted wing 5 and an engine 7 suspended from the wing 5.

The aircraft includes a front passenger exit 6 and a central passenger exit 9. The central exit 9 comprises an opening defined by, and located in a side of, the fuselage 3 and a door (not shown) associated with the opening. The central exit 9 is suitable for passenger access to the fuselage interior (not shown) which houses a passenger cabin. The central exit 9 is located in a central region of the aircraft, at approximately 45% of the cabin length. The exit is therefore level with the front of the engines 7 and cannot be accessed using conventional airstairs which typically protrude at 90 degrees to an aircraft fuselage.

The aircraft 1 of the first embodiment of the invention comprises a walkway 11 moveable between a stowed position (shown in FIG. 1*d*) and a deployed position (shown in FIGS. 1*a* to 1*c*).

Referring to FIGS. 1*a* to 1*c*, the aircraft 1 is arranged such that the walkway 11, in the deployed position, defines a path 11*a* all of which extends from the fuselage 3 at an angle, when viewed from above, of 40 degrees to the longitudinal axis 15 of the aircraft 1. The walkway 11 therefore extends at such an angle as to be kept away from surrounding parts of the aircraft structure, such as the wing 5 and the aircraft engines 7. In addition, the walkway is angled such that it is outside a prohibited region surrounding the aircraft engines 7, into which passengers are not allowed to enter.

The walkway, in the deployed position, also extends at an angle of 50 degrees to the horizontal. The walkway thus connects the exit 9 with the ground 17, enabling passengers to embark or disembark the aircraft. The path defined by the walkway in the deployed position comprises a stepped surface to ease passenger movement up and down the relatively steep walkway.

Referring to FIG. 1*d*, the walkway 11 in the stowed position (shown in phantom), is located beneath the aircraft floor in the aircraft fuselage 3. The aircraft 1 is arranged such that the walkway 11, in the stowed position, is located at an angle, when viewed from above, of 40 degrees to the longitudinal axis of the aircraft (i.e. equal to the angle of the walkway when viewed from above in the deployed position).

This has a number of advantages. In particular, the length of the walkway 11 is not limited to the width of the fuselage 3 (as it would be if it were stowed at 90 degrees to the longitudinal axis of the fuselage). This enables the walkway 11 to be stowed with a length of up to about 150% of the width W of the fuselage. Thus, the length of the walkway 11 in the stowed position can be, and is in this embodiment, equal to the length of the walkway 11 in the deployed position.

Allowing the walkway to be stowed in a position at angle, other than perpendicular, to the longitudinal axis of the fuselage allows the walkway 11 to be a unitary structure as it does not (in contrast to known designs) need to be disassembled, or collapsed in length, for stowage. The design is therefore particularly simple. The walkway 11 on the aircraft of the first embodiment comprises an aluminium support frame with step treads fixedly mounted therein. The handrails are also fixedly mounted on the edge of the support frame.

Stowing the walkway 11 at an angle to the longitudinal axis 15 of the aircraft also enables relatively simple deployment of the walkway. The walkway is, in the stowed position, slideably mounted on rails (not shown) which direct the walkway at an angle of 40 degrees to the axis of the aircraft. The rails are positioned such that once the walkway has been slid to the extreme end of the rails, the walkway is, at one end, mounted on the lip of the aircraft exit. The walkway is pivotably mounted in this position (on a simple gear system—not shown) and can thus be pivoted to the deployed position shown in FIGS. 1*a* to 1*c* with relative ease.

FIGS. 2*a* to 2*c* are views of an aircraft according to a second embodiment of the invention. The aircraft is broadly as described with reference to the first embodiment except for the differences described below.

Firstly, the walkway of the second embodiment can be used to access a variety of locations remote from the aircraft, and not just the ground. The walkway 111 is moveable between a stowed position (broadly the same position as described above with reference to FIG. 1*d*, but described in more detail below), a first deployed position (generally the same position as that shown in FIGS. 1*a* to 1*c*) and a second deployed position shown in FIGS. 2*a* to 2*c*.

Referring to FIGS. 2*a* to 2*c*, the walkway 111 extends at angle of −5 degrees to the horizontal to connect the central exit 109 with an airbridge 123 located in an airport terminal. (The angle of inclination relative to the horizontal has a negative sign to indicate that, in contrast to the first deployed position, the walkway extends from the exit 109 with an upward slope.) The path defined by the walkway 111 extends at an angle of 40 degrees to the longitudinal axis of the aircraft. The walkway therefore allows the central exit 109 to be used by passengers, despite it being in a location that would not normally be directly accessible by an airbridge.

Figure 3:
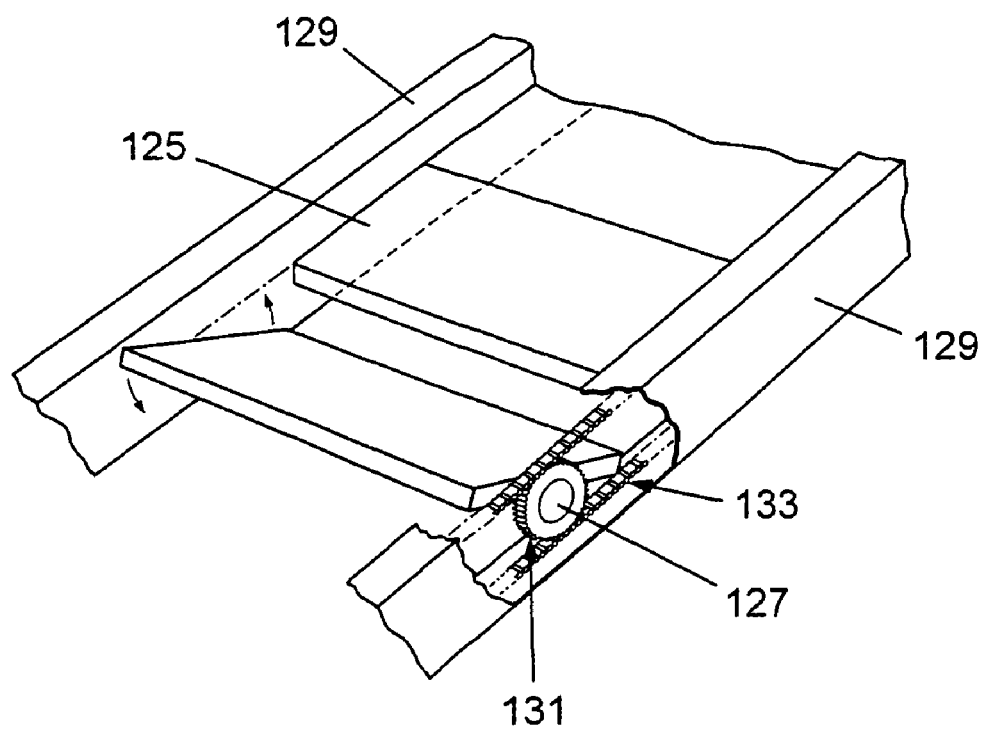
FIG. 3 is a view of the walkway on the aircraft according to the second embodiment of the invention.
Figure 4A:
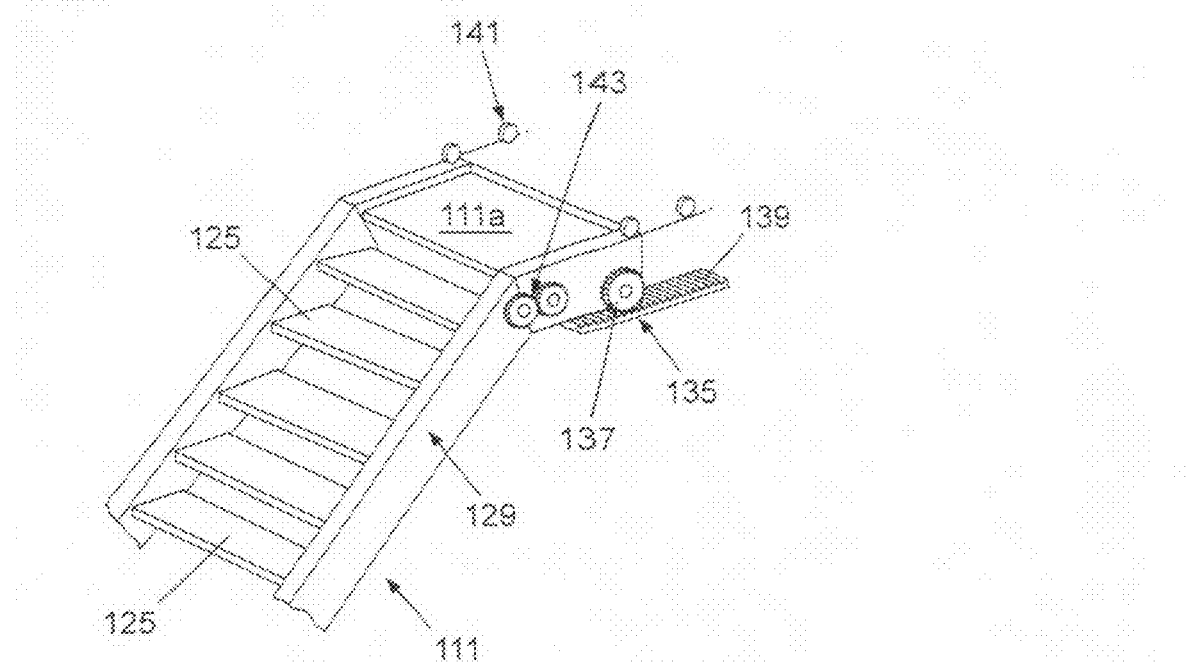
FIGS. 4*a* and 4*b* are views of the walkway on the aircraft according to the second embodiment of the invention.
Figure 4B:
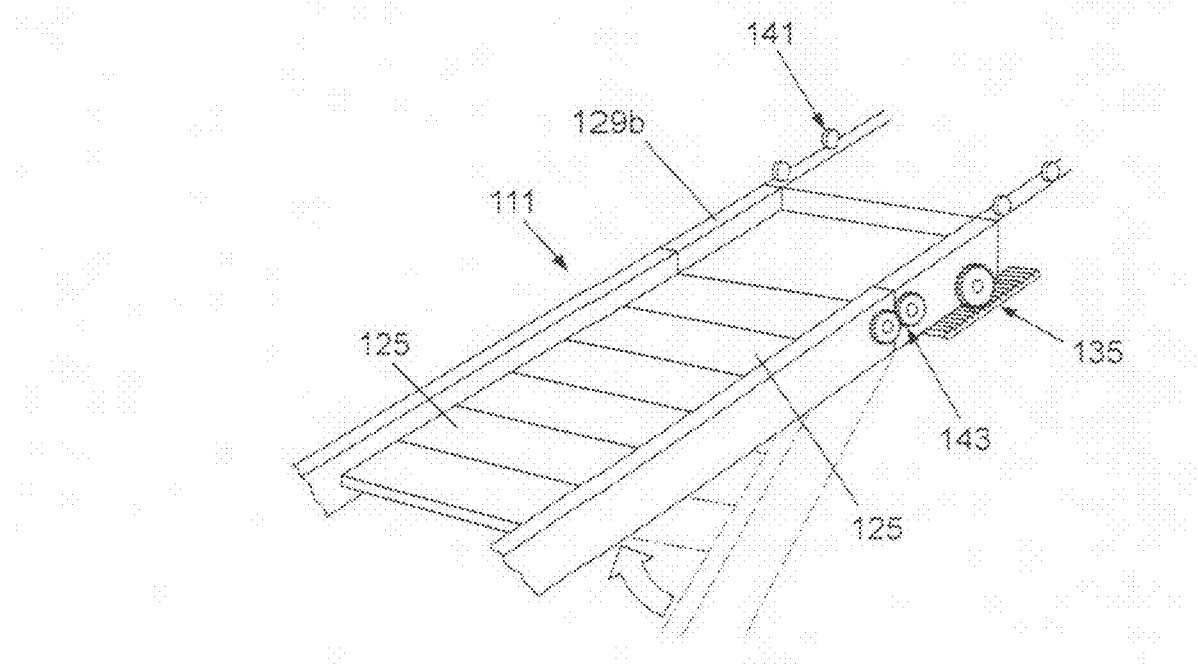
Figure 5:
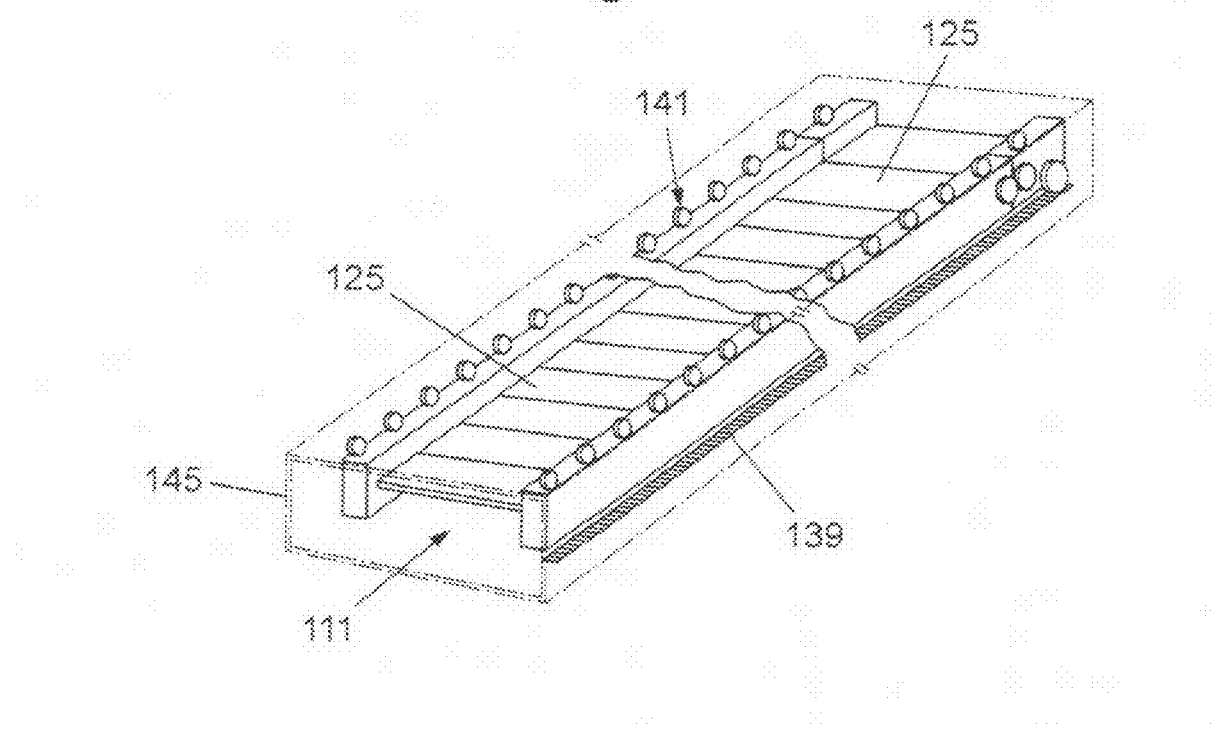
FIG. 5 is a view of the walkway, in the stowed position, on the aircraft according to the second embodiment of the invention.

The walkway 111 comprises a plurality of step treads 125 (see FIGS. 3 to 5). The walkway 111 of the second embodiment of the invention is arranged such that, in the deployed position (generally the same position as that shown in FIGS. 1*a* to 1*c*) the step treads 125 define a stepped surface comprising a plurality of discrete steps. However, in the second deployed position, the step treads 125 are generally co-planar such that the walkway defines a substantially even surface as shown in FIGS. 2*a* to 2*c*.

This is particularly advantageous since the walkway 111 can be arranged in the first deployed position or the second deployed position to provide, respectively, a stepped surface for relatively steep paths, and an even surface for, in particular, relatively shallow or horizontal paths.

Details of the walkway 111 and the walkway deployment arrangement are shown in FIGS. 3 to 5 (although the Figures do not show the handrail arrangement for the sake of clarity). Referring to FIG. 3, the walkway comprises a multiplicity of treads 125 which are each mounted on a respective shaft 127. Each tread shaft is mounted for rotation about its axis and extends between two stair support beams 129. A cog 131 is mounted on the end of each tread 125 and is supported in the support beams 129. A chain 133 is moveably mounted in the beam 129 and engages with each of the cogs 131, as well as engaging with a driving motor. The angle of the treads 125 relative to the beams 129 can be changed by moving the chain with the driving motor. This movement enables the treads 125 to either form a stair, as shown in FIGS. 1*a* to 1*c* and FIG. 4*a*, or a continuous surface, as shown in FIGS. 2*a* to 2*c* and FIG. 4*b*.

Referring to FIGS. 4*a* and 4*b*, the walkway structure itself is moveable between the deployed positions and the stowed position by a motor, rack, and pinion arrangement 135. One end 111*a* of the walkway 111 contains a motor, which drives a pinion wheel 137 located on a lower edge of the walkway, along a rack 139. The rack 139 is positioned at 40 degrees to the longitudinal axis of the aircraft. The aircraft also comprises a roller arrangement 141 associated with the rack, and orientated at the same angle, which is arranged to accommodate the upper edge of the walkway 111. The motor, rack and pinion arrangement 135 at the end of the walkway is thus arranged to smoothly translate the walkway into and out of the aircraft fuselage 103.

A separate and independent motor is arranged to drive another cog arrangement 143 near the end of the walkway. This cog arrangement 143 rotates the main section of the walkway 111 with respect to the horizontal, as is shown in FIGS. 4*a* and 4*b*.

The cog arrangement 143 is thus arranged to move the walkway between the deployed positions, and in part, between the deployed positions and the stowed position. The motor, rack, and pinion arrangement 135 is arranged to move the walkway between an intermediate position and the stowed position.

The walkway 111 is operated in such a way that in the stowed position all the step treads 125 are generally coplanar, such that the walkway 111 defines a substantially even surface. The walkway is therefore substantially flat when stowed such that it occupies relatively little space in the aircraft. The walkway may therefore be stowed, between the rollers 141 and the rack 139 in the compact box structure 145 shown in FIG. 5. The walkway 111, in the stowed position, is located at an angle, when viewed from above, of 40 degrees to the longitudinal axis of the aircraft.

Figure 6A:
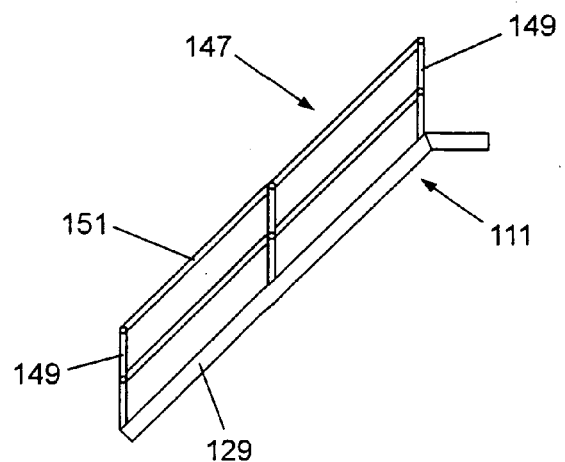
FIGS. 6*a* to 6*c* are views of the walkway on the aircraft according to the second embodiment of the invention.
Figure 6B:
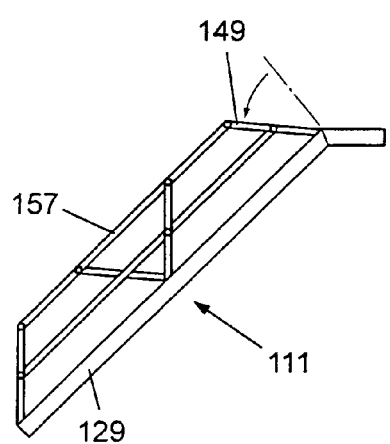
Figure 6C:
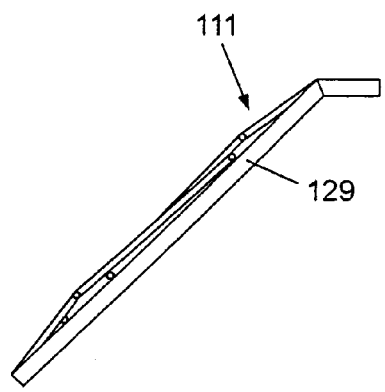

The walkway on the aircraft of the second embodiment comprises two handrails along the support beams defining longitudinal edges of the walkway. FIGS. 6a to 6c are side views of this walkway 111, with particular focus on the handrails 147 for the sake of clarity.

The handrails 147 are mounted on the support beams 129 and are moveable between a deployed position and a stowed position. Each handrail is in the deployed position when the walkway 111 is in first or second deployed positions and is moved into the stowed position just before the walkway 111 is moved to the stowed position.

Each handrail comprises two separate frames, each frame extending over half the length of the walkway 111 (i.e. the handrail comprises four vertical supports 149 (one at each end and two in the centre) and four longitudinal rails 151 arranged to link the vertical supports 149).

To enable the handrails to be moveable between the two positions, vertical supports 149 are rotatably mounted on the walkway support beams and longitudinal rails 151 are pivotably mounted on the vertical supports 149. The two central vertical supports (which are substantially in line in FIGS. 6a and 6b) are mounted at the same position along the length of the walkway, and slightly offset from one another in the transverse direction to enable the supports to be folded in opposite directions.

In the deployed position (shown in FIG. 6a), the vertical supports are fixed in position via a locking arrangement, thereby creating a rigid structure to assist, and reassure passengers, moving over the walkway. In a position (shown in FIG. 6c) shortly before the walkway 111 is moved to the stowed position, the handrails are folded down and located substantially in the plane of the walkway, thereby enabling the walkway to be compactly stowed. To move the handrails from the deployed to the stowed position, the locking arrangement is released and the upper and lower parts of the handrail are rotated in opposite directions (see FIG. 6b). This movement of the handrails is typically effected manually by ground staff. In another embodiment of the invention (not shown) the movement of the handrails is mechanically actuated by an electric motor.

In a third embodiment of the invention, the walkway in the deployed position defines a path, a 5 m portion of which extends from the fuselage at an angle, when viewed from above, of 70 degrees to the longitudinal axis of the aircraft. The remainder of the path is at 90 degrees to the fuselage, but the provision of an inclined portion allows the walkway to be used on exits that would otherwise have been inaccessible had all of the walkway extended at an angle of 90 degrees.

In the third embodiment, the walkway 211, in the stowed position (shown in FIG. 7), is located at an angle, when viewed from above, of 30 degrees to the longitudinal axis of the aircraft. The angle is measured in a clockwise direction from the longitudinal axis of the aircraft. The walkway 211, in the stowed position, is thus generally pointing (from the opening 209) towards the front of the aircraft. The walkway is swung, during movement from the stowed to the deployed position, through 110 degrees about a pivot point on the door sill of the aircraft opening 209.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft comprising (i) a fuselage defining a fuselage interior, (ii) an opening defined by, and located in a side of, the fuselage, and suitable for passenger access to the fuselage interior, and (iii) a walkway moveable between a stowed position and a first deployed position in which the walkway extends from the fuselage at a first angle to the horizontal and connects the opening with a location remote from the aircraft, wherein
    the walkway is also moveable between the stowed position and a second deployed position, in which the walkway extends from the fuselage at a second angle to the horizontal and connects the opening with a location remote from the aircraft, the second angle being different from the first angle,
    a longitudinal portion of the walkway, in the first deployed position, defines a stepped surface having a first step height, whereas
    that longitudinal portion of the walkway, in the second deployed position, defines either (a) a substantially even surface, or (b) a stepped surface having a second step height, the second step height being less than the first step height.

2. An aircraft according to claim 1, wherein the walkway comprises a plurality of step treads, and the walkway is arranged such that, in the first deployed position, the step treads define the stepped surface comprising a plurality of discrete steps having the first step height, whereas in the second position, the step treads either (a) are generally coplanar such that at least a portion of the walkway comprising the step treads defines a substantially even surface, or (b) define the stepped surface comprising a plurality of discrete steps having the second step height.

3. An aircraft according to claim 1, wherein the walkway, in the stowed position, defines a substantially even surface.

4. An aircraft according to claim 1, wherein the walkway, in the deployed position, comprises a barrier located along at least part of a longitudinal edge of the walkway, the barrier being moveable, relative to the walkway, between a deployed position and a stowed position, the barrier being in the deployed position when the walkway is in the deployed position, and the barrier being in a stowed position when the walkway is in the stowed position.

5. A walkway suitable for use as the walkway on the aircraft according to claim 1.

6. A walkway comprising a plurality of step treads, wherein the walkway is moveable to a first deployed position, the walkway is moveable to a second deployed position, and the walkway is arranged such that, in the first deployed position, the step treads define a stepped surface comprising a plurality of discrete steps having a first step height, whereas in the second deployed position, the step treads either (a) are generally co-planar such that at least a portion of the walkway comprising the step treads defines a substantially even surface, or (b) define a stepped surface comprising a plurality of discrete steps having a second step height, the second step height being less than the first step height, wherein the walkway is so arranged that when the walkway is in the first deployed position the walkway extends in a direction at a first angle to a plane that is parallel with the step treads and when the walkway is in the second deployed position the walkway extends in a direction at a second angle to a plane that is parallel with the step treads, the second angle being different from the first angle.

7. A method of operating an aircraft, wherein the method comprises the steps of:
 a) providing an aircraft comprising (i) a fuselage defining a fuselage interior, (ii) an opening defined by, and located in a side of, the fuselage, and suitable for passenger access to the fuselage interior, and (iii) a walkway moveable between a stowed position and a first deployed position in which the walkway extends from the fuselage at a first angle to the horizontal and connects the opening with a location remote from the aircraft, a longitudinal portion of the walkway, in the first deployed position, defining a stepped surface having a first step height,
 b) moving the walkway between the stowed position and a second deployed position in which the walkway connects the opening with a location remote from the aircraft, the second angle being different from the first angle, said longitudinal portion of the walkway, in the second deployed position, defining either (i) a substantially even surface, or (ii) a stepped surface having a second step height, the second step height being less than the first step height.

8. A method according to claim 7, wherein the walkway comprises a plurality of step treads, and the step of moving the walkway between the stowed position and the second deployed position includes rotating each step tread relative to the walkway about a horizontal axis that is transverse to the length of the walkway in the region of the tread.

9. A method according to claim 7, wherein the method comprises the steps of:
 a first motor causing movement of the walkway, the movement including a component of rotation about a horizontal axis, and
 a second motor, independent of the first motor, causing the rotation of each step tread relative to the walkway about a horizontal axis.

* * * * *